United States Patent
Habu (10) Patent No.: US 7,333,602 B2
(45) Date of Patent: Feb. 19, 2008

(54) INFORMATION ENTRY SYSTEM

(76) Inventor: Tomohiro Habu, 1-6-1-202 Ohara, Setagaya-ku, Tokyo, 156-0041 (JP)

( * ) Notice: Subject to any disclaimer, the term of this patent is extended or adjusted under 35 U.S.C. 154(b) by 224 days.

(21) Appl. No.: 11/018,212

(22) Filed: Dec. 20, 2004

(65) Prior Publication Data

US 2005/0195170 A1 Sep. 8, 2005

Related U.S. Application Data

(63) Continuation-in-part of application No. 09/758,335, filed on Jan. 12, 2001, now Pat. No. 6,925,169.

(30) Foreign Application Priority Data

Jan. 13, 2000 (JP) ............................. 2000-004959

(51) Int. Cl.
*H04M 1/00* (2006.01)
*H04M 3/00* (2006.01)
(52) U.S. Cl. ................................. 379/368; 379/433.07
(58) Field of Classification Search ................ 379/368, 379/433.07; 345/168, 173
See application file for complete search history.

(56) References Cited

U.S. PATENT DOCUMENTS 4,882,582 A * 11/1989 Oka ............................. 341/23
6,084,576 A * 7/2000 Leu et al. .................... 345/168
6,272,637 B1 * 8/2001 Little et al. .................. 713/194
6,549,194 B1 * 4/2003 McIntyre et al. ........... 345/173
6,925,169 B2 * 8/2005 Habu .......................... 379/368
7,007,168 B2 * 2/2006 Kubo et al. .................. 713/183

FOREIGN PATENT DOCUMENTS

| JP | 02-245871 | | 10/1990 |
| JP | 05300206 A | * | 12/1993 |
| JP | 06-318186 | | 11/1994 |
| JP | 09-303013 | | 11/1997 |
| JP | 11-086093 | | 3/1999 |
| JP | 2001-109559 | | 4/2001 |
| JP | 2002-32176 | | 1/2002 |
| JP | 2005-025284 | | 1/2005 |

* cited by examiner

*Primary Examiner*—Ramnandan Singh
(74) *Attorney, Agent, or Firm*—Konomi Takeshita (57) ABSTRACT

The present invention is an information entry system comprising a touch panel monitor screen, wherein the touch panel monitor screen displays keys for information entry, which are arranged circularly in order and the keys are rotationally shifted by a random number of key units around the center of the circular arrangement without changing the order when a user touches a predetermined option key before or after the information entry. This system also has a central processing unit and a program storage unit including an Information entry Screen Generator, a Random Number Generator, a Key Moving Unit, and a PIN Information output unit. This information entry device prevents a PIN or any other information entry from being stolen by someone who glances at the finger movement, since the entire series of the entry keys are rotated before or after the PIN entry.

1 Claim, 10 Drawing Sheets

| decimal | binary | The information on the key | The infomation tag | a | b | c | d | e | f | g | h | i | j | k | l |
|---|---|---|---|---|---|---|---|---|---|---|---|---|---|---|---|
| | | | | \multicolumn{12}{c}{The location of key pushed} |
| 0 | 0000 | 0 | | 0 | * | # | 1 | 2 | 3 | 4 | 5 | 6 | 7 | 8 | 9 |
| 1 | 0001 | 1 | | 1 | 2 | 3 | 4 | 5 | 6 | 7 | 8 | 9 | 0 | * | # |
| 2 | 0010 | 2 | | 2 | 3 | 4 | 5 | 6 | 7 | 8 | 9 | 0 | * | # | 1 |
| 3 | 0011 | 3 | | 3 | 4 | 5 | 6 | 7 | 8 | 9 | 0 | * | # | 1 | 2 |
| 4 | 0100 | 4 | | 4 | 5 | 6 | 7 | 8 | 9 | 0 | * | # | 1 | 2 | 3 |
| 5 | 0101 | 5 | | 5 | 6 | 7 | 8 | 9 | 0 | * | # | 1 | 2 | 3 | 4 |
| 6 | 0110 | 6 | | 6 | 7 | 8 | 9 | 0 | * | # | 1 | 2 | 3 | 4 | 5 |
| 7 | 0111 | 7 | | 7 | 8 | 9 | 0 | * | # | 1 | 2 | 3 | 4 | 5 | 6 |
| 8 | 1000 | 8 | | 8 | 9 | 0 | * | # | 1 | 2 | 3 | 4 | 5 | 6 | 7 |
| 9 | 1001 | 9 | | 9 | 0 | * | # | 1 | 2 | 3 | 4 | 5 | 6 | 7 | 8 |
| 10 | 1010 | * | | * | # | 1 | 2 | 3 | 4 | 5 | 6 | 7 | 8 | 9 | 0 |
| 11 | 1011 | # | | # | 1 | 2 | 3 | 4 | 5 | 6 | 7 | 8 | 9 | 0 | * |

*The sensor is at the location "a".
When the key at the location "d" is pushed, and if the key at the sensor is "5", the information of the pushed key is "8"

INFORMATION ENTRY SYSTEM

CROSS-REFERENCE TO RELATED APPLICATION

This application is a continuation-in-part application, based on U.S. application Ser. No. 09/758,335, filed on Jan. 12, 2001, now U.S. Pat. No. 6,925,169 the disclosure of which is incorporated by reference.

BACKGROUND OF THE INVENTION

1. Technical Field of the Invention

This invention relates to an information entry system, wherein provision is made for protecting the information entry such as a PIN from being stolen.

2. Description of Prior Art/Current Technology

Various kinds of financial transaction services are provided by using IT (Information Technology) these days, such as credit cards, debit cards, digital wallets by use of smart cards and so on. Information of the card is kept in the magnetic stripe or IC chip of the card. Also, we can now use a public phone by entering a call card number instead of inserting a coin.

To use these services, a PIN or password entry is required for user identification. Nowadays using a credit card requires signature. But when a smart card is used for a credit card instead of a magnetic stripe, it requires a PIN entry. The arrangement of keys of a PIN pad on an ATM and the like is specified in ISO 9564-1 Annex-F. This specifies the key arrangement of a PIN pad to be configured as 3 numbers horizontal and 4 lines vertical. The numeric number starts from the left of the top line. However, this fixed arrangement makes it easy for another person to steal the PIN we enter by glancing at the movement of our finger based on the fixed arrangement of the keys.

In order to solve this problem, one may use a device that changes the key arrangement randomly on a touch panel screen monitor each time we enter our password. But this type of device is difficult to use, as the order of keys is random. This random arrangement of keys leads to mis-touching the keys, and it takes a lot of time to push a number because a user has to look for the keys. Further, a serious problem is that a visually handicapped person cannot use this device. Furthermore, monitor screens of this type are expensive.

BRIEF SUMMARY OF THE INVENTION

1. The Objective of the Invention

The objective of this invention is to protect the information entry such as a PIN from theft by observation of the movement of our finger based on the fixed arrangement of the keys. Another objective is to provide ease of pushing keys for users, especially visually handicapped people, without changing the key arrangement.

2. The Method to Solve the Problem

The invention is made to achieve the above objectives. The invention is an information entry system comprising a touch panel monitor screen, wherein the touch panel monitor screen displays keys for information entry, which are arranged circularly in order and rotates around the center of the circular arrangement without changing the order when a user touches a predetermined option key.

The user can rotate the entry keys on the monitor screen before or after entering his PIN. By changing the locations of the keys by the rotation, it is possible to protect the PIN from being stolen by someone who tries to glance at the finger movement. Since the keys are circularly arranged in order, not random, it is easy for users including visually handicapped people to touch the keys even after rotating this device. Accordingly, this invention provides a user with an information entry device that prevents the PIN theft and key-mistouching.

The above discussed and other features and advantages of the present invention will be appreciated and understood by those skilled in the art from the following detailed description and drawings.

DETAILED DESCRIPTION OF THE PREFERRED EMBODIMENTS

Although the spirit and scope of the present invention is best described with the main non-mechanical embodiment referring to FIG. 7-10, in order to explain the invention in depth, a mechanical example is described with the mechanical embodiment, referring FIG. 1-6.

Figure 1:
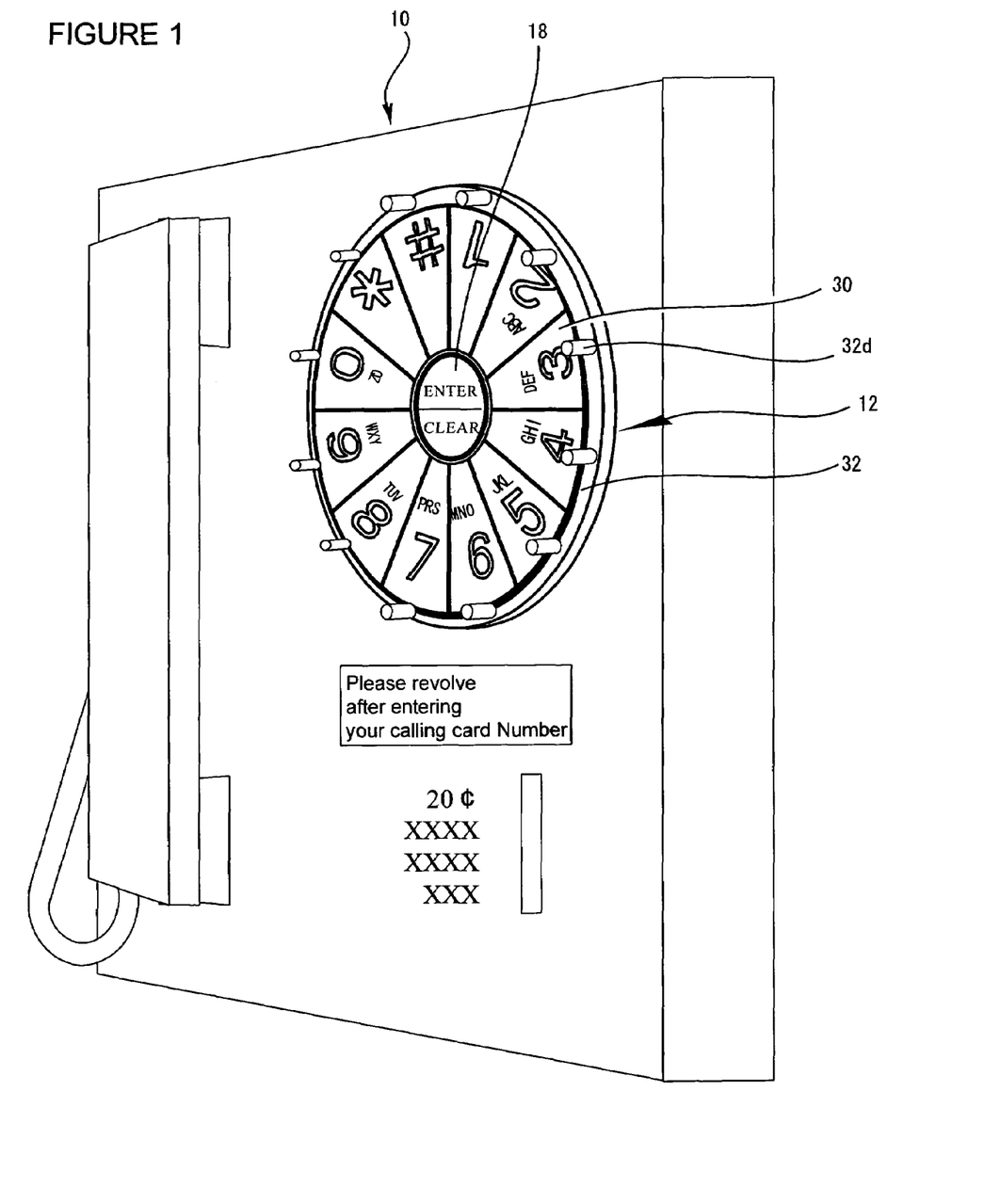
FIG. 1: The perspective view of the information entry device adapted for a public phone according to the mechanical embodiment.

FIG. 1 is the perspective view of a public phone for which this device is adapted. The information entry device of this invention 12 is attached to the body of the public phone 10.

Figure 2:
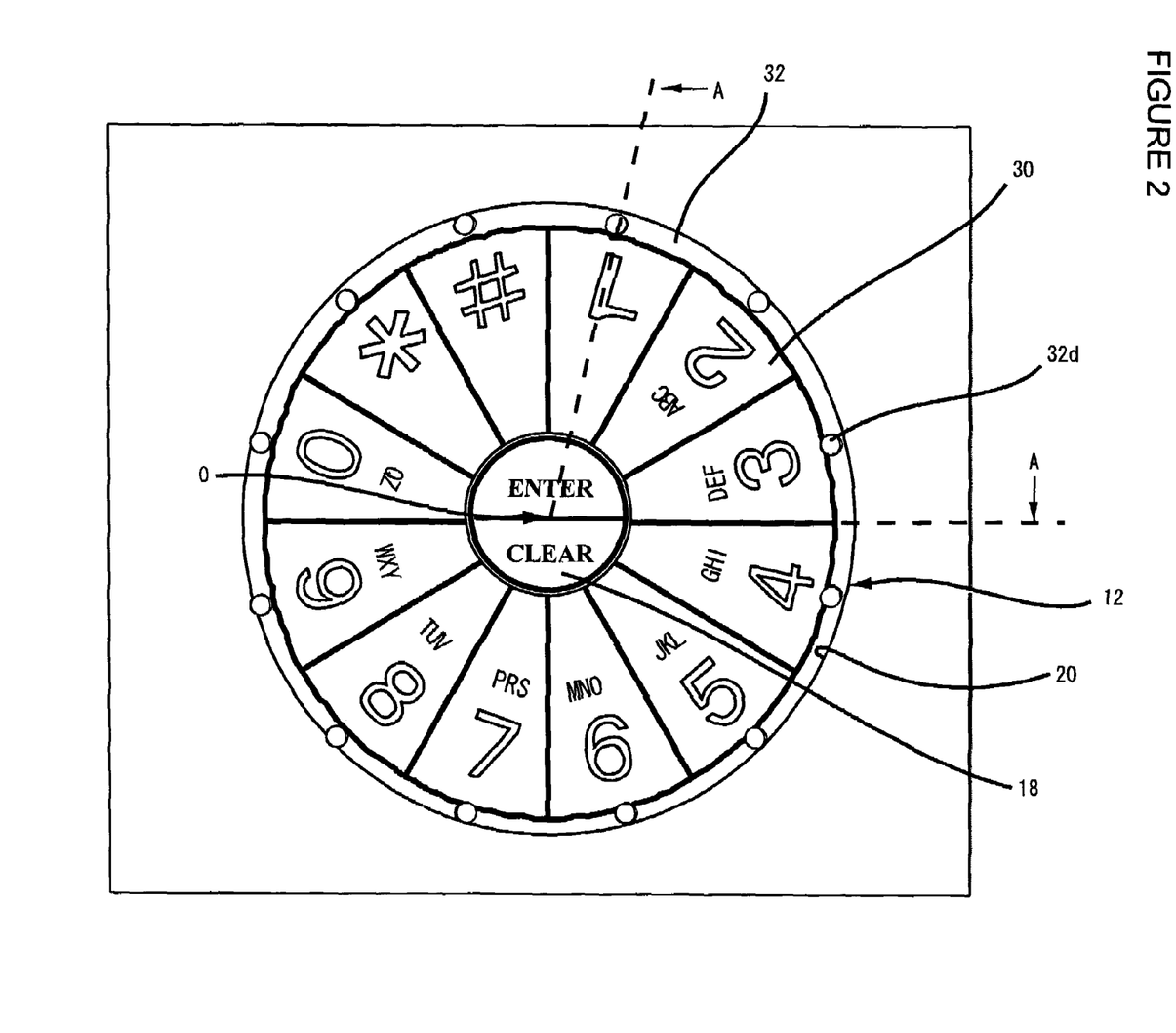
FIG. 2: The front view of the information entry device according to the mechanical embodiment.
Figure 3:
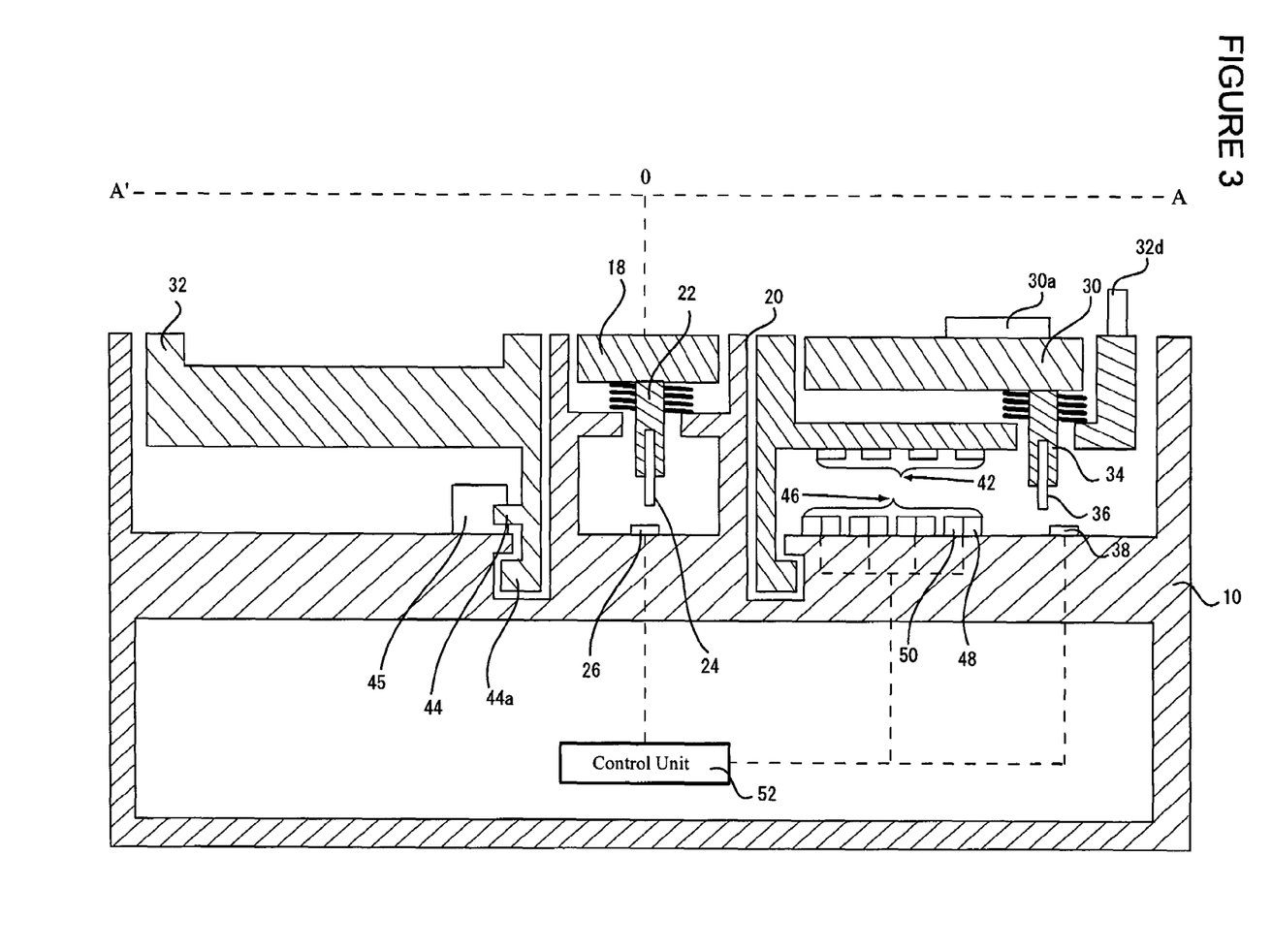
FIG. 3: The cross-sectional view along the line A-O and the cross-sectional view along the line A'-O in FIG. 2 are shown side-by-side.

FIG. 2 is the expanded view from the front of the information entry device 12. In FIG. 3, the cross-sectional view along the line A-O and the cross-sectional view along the line A'-O are shown side-by-side. A center button of "Enter/Clear" 18 is installed on the body of the public phone 10 at the center of the information entry device 12. A groove 20 is concentrically provided around the center button 18 as shown in FIGS. 2 and 3. Each key 30 has a button comprising connection elements 34,36, and 38, which send the electronic signal when the button is pushed.

Figure 4:
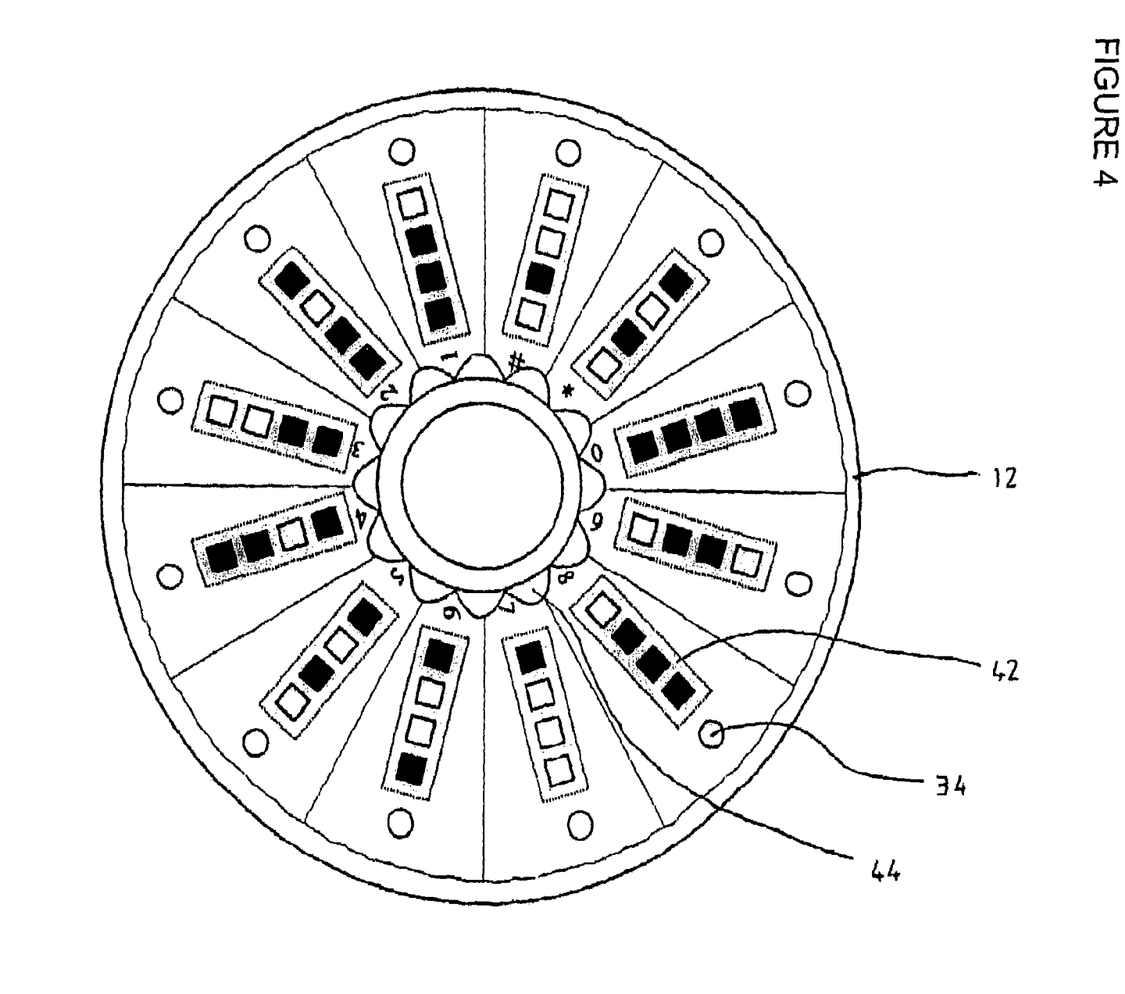
FIG. 4: The backside view of the support base of the information entry device.

The information entry device 12 has the entry keys 30 and a circular support base 32 on which the entry keys are mounted. The support base 32 is provided concentrically in the groove 20, and is able to rotate around the center button 18. Specifically, the support base is attached rotatably to the body of the public phone 10 by means of a small groove formed by protrusions 44 and 44a. As shown in FIGS. 3 and 4, pairs of the protrusions 44 and 44a are provided between individual entry keys 30. A ratchet 45 for engaging one of the protrusions 44 is provided on the body of the public phone 10 in order to stop the rotation at the right point where the buttons of the keys work.

Twelve entry keys 30 are circularly arranged on the support base 32. The numbers and symbols such as 0-9, # and * are displayed on respective keys 30 by raised markings 30a, in order to enable visually handicapped people to recognize the respective information of the keys by touch.

Knobs 32d are provided at the edge of the support base 32 so as to enable users to easily rotate the support base.

Figure 5:
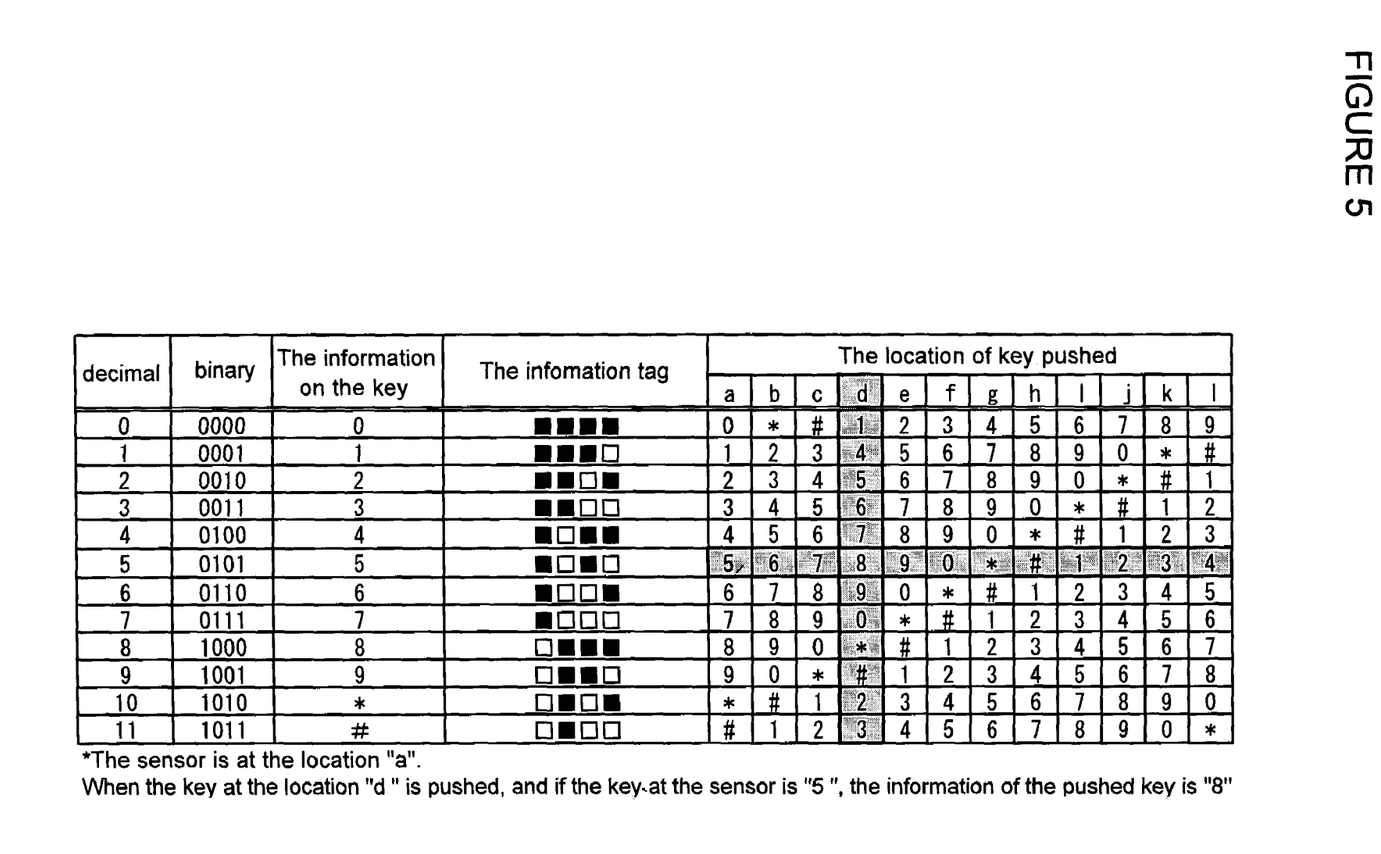
FIG. 5: The matrix of information of the entry keys with information tags.

As shown in FIG. 3, an information tag 42 is attached on the backside of the support base 32 below each entry key 30. The information tags 42 have a binary coding system using reflectors and non-reflectors as shown in FIGS. 4 and 5. For example, the second line of FIG. 5 shows the case of "1" wherein the rightmost is a reflector and the others are non-reflectors.

Figure 6:
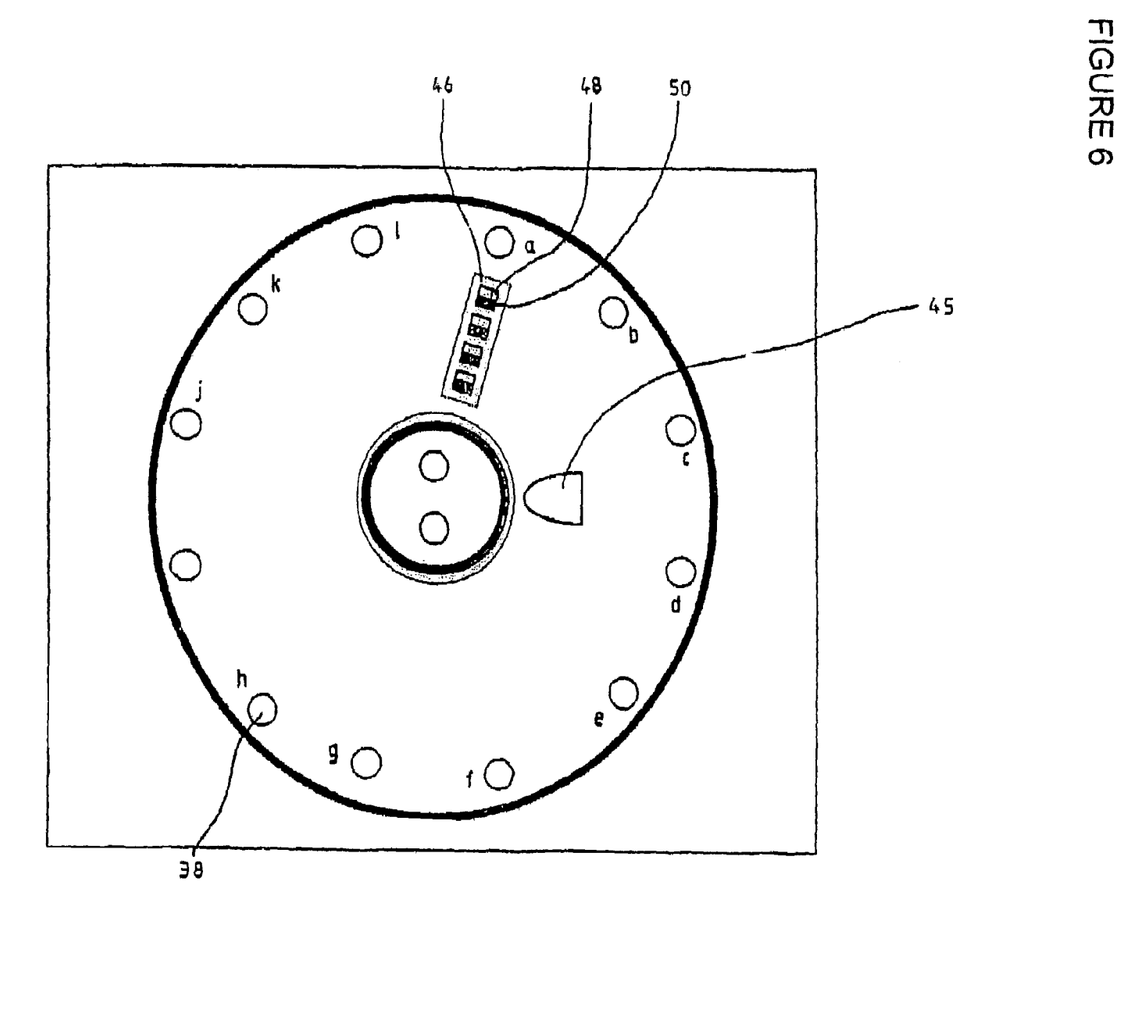
FIG. 6: The front view of the bottom of the groove provided on the body of the public phone.

As shown in FIGS. 3 and 6, a sensor 46 is attached at a predetermined fiduciil point on the groove 20. The sensor 46 has four pairs of an optical sensor 50 and a light-emitting diode (LED) 48. This sensor 46 is connected to a control unit 52.

How this information entry device works when a user enters his PIN is explained as follows. First, the user arbitrarily rotates the support base 32 using the knobs 32d. The rotation will stop at some right position by means of the ratchet 45 for engaging one of the protrusions 44, where the button 34,36, and 38 of each key works. Then the user pushes the "Enter/Clear" key 18. The button comprising connection elements 22,24, and 26 sends an electronic signal to the control unit 52. Then the control unit 52 receives the information of the key at the fiducial point from the sensor 46. When the user pushes a necessary entry key, the control unit recognizes the information of the entry key that the user pushed by obtaining the relative location of the key pushed with respect to the fiducial point, as shown in FIG. 5.

When the information of the key at the fiducial point is "1", and the key pushed is the second right of the fiducial point, the control unit 52 recognizes that the information of the key pushed is "3". (This is the case wherein the key at the fiducial point is "a" which is actually "1" as sensed by the sensor 46, and the key "c" is pushed, as can be seen in FIG. 6.) The user finishes entering his 4 digit PIN by pushing three more keys, and the above key-recognition process repeats three more times.

The main embodiment of the information entry system of this invention is explained below with reference to FIGS. 7-10.

Figure 7A:
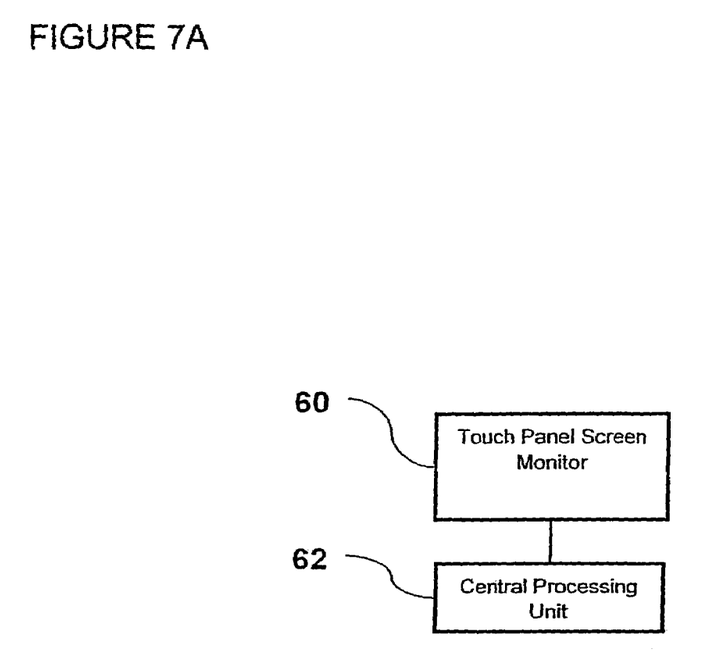
FIG. 7A: The overview of the touch panel screen of an ATM or PDA.
Figure 7B:
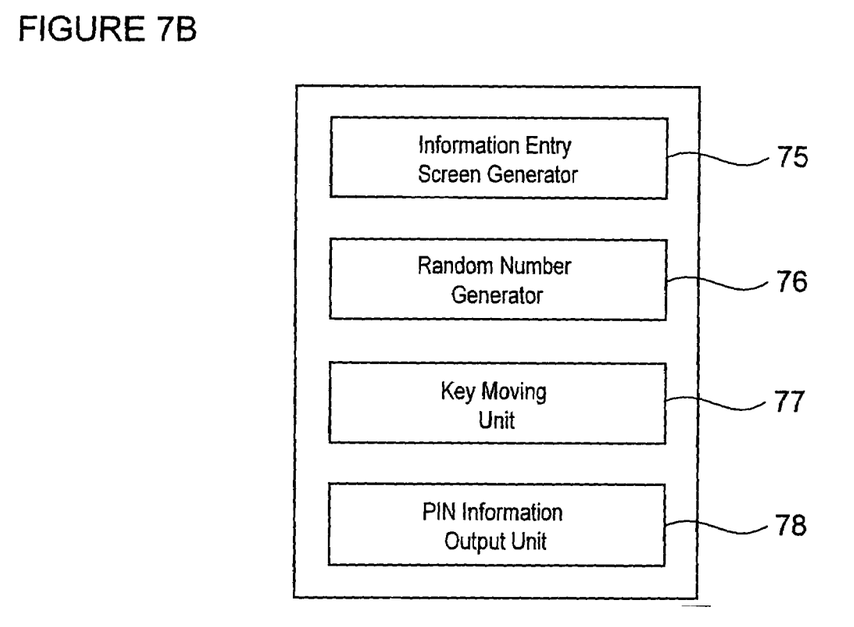
FIG. 7B: The overview of the program structure of this invention.

FIG. 7A is an overview of the touch panel screen of an ATM or PDA This system has a touch panel 60 and a Central Processing Unit (CPU) 62. The CPU 62 may be connected to a program storage unit and a memory unit. As shown in FIG. 7B, the program storage unit stores an Information Entry Screen Generator 75, a Random Number Generator 76, a Key Moving Unit 77, and a PIN Information Output Unit 78. Each of the aforementioned Information Entry Screen Generator, Random Number Generator, Key Moving Unit, and PIN Information Output Unit functions as structure of this invention as each of them is executed by the CPU 62 after being deployed on a RAM.

Figure 8A:
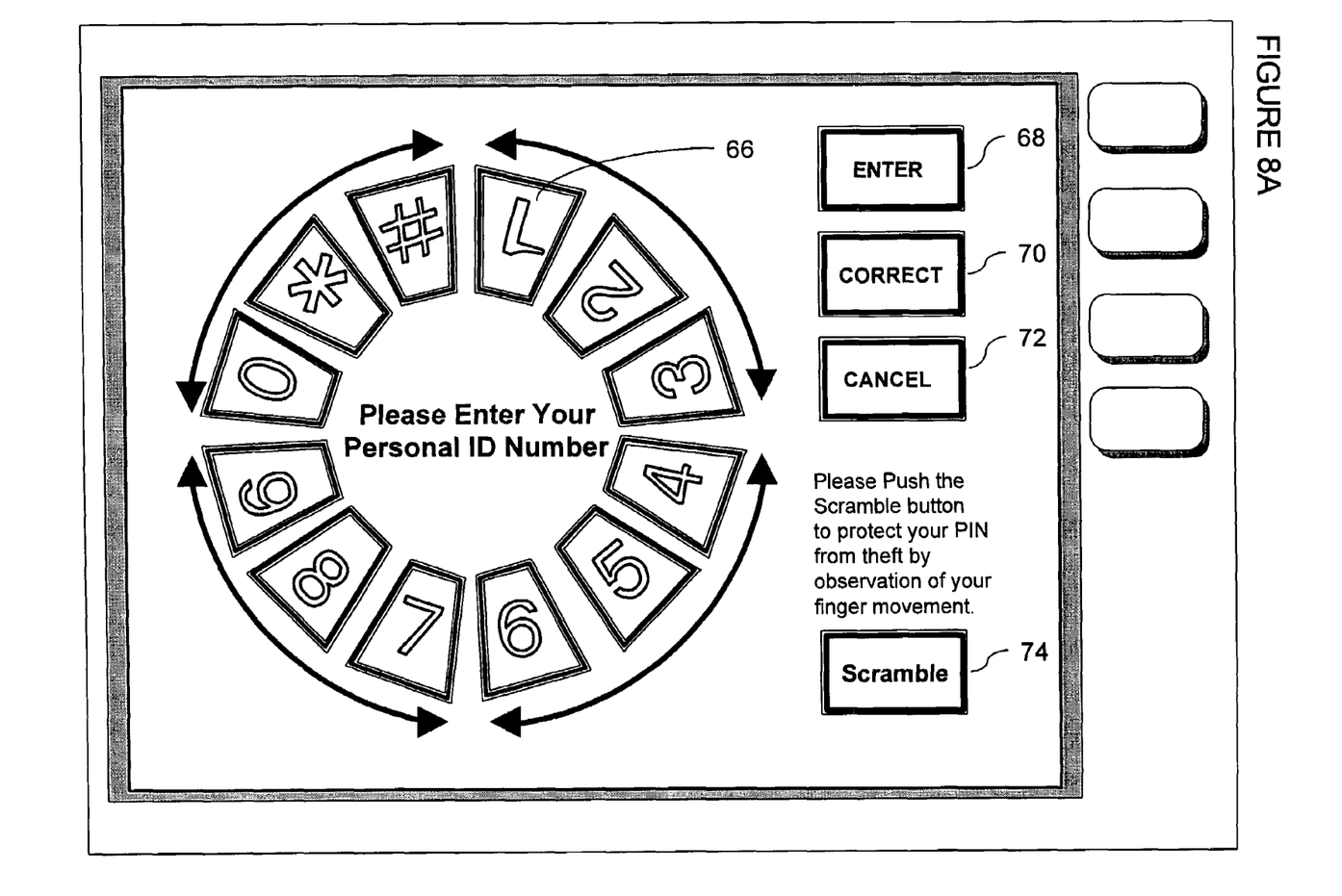
FIG. 8A: The PIN entry screen of an ATM using the information entry system according to the main embodiment.

FIG. 8A shows the PIN entry screen of an ATM or PDA for which the information entry system of the present invention is adopted. The CPU 62 controls the touch screen monitor, which displays entry keys 66, an "Enter" button 68, a "Correct" button 70, a "Cancel" button 72, and a "Scramble" button 74 (Information Entry Screen Generator). The twelve keys 66 have respective information of 0-9, # and *.

These keys are circularly arranged in order. When the user touches the "Scramble" button 74 (Random Number Generator), these entry keys 66 rotate in order and stop at some point (Key Moving Unit). After the rotation of the keys, the CPU 62 obtains the rotation information by storing the number of key units shifted by the rotation (PIN Information Output Unit). Although the twelve keys 66 depicted in FIG. 8 are arranged in a circular shape like that of a rotary phone, the shape of the twelve keys 66 may be rectangular or any other suitable shapes.

Figure 8B:
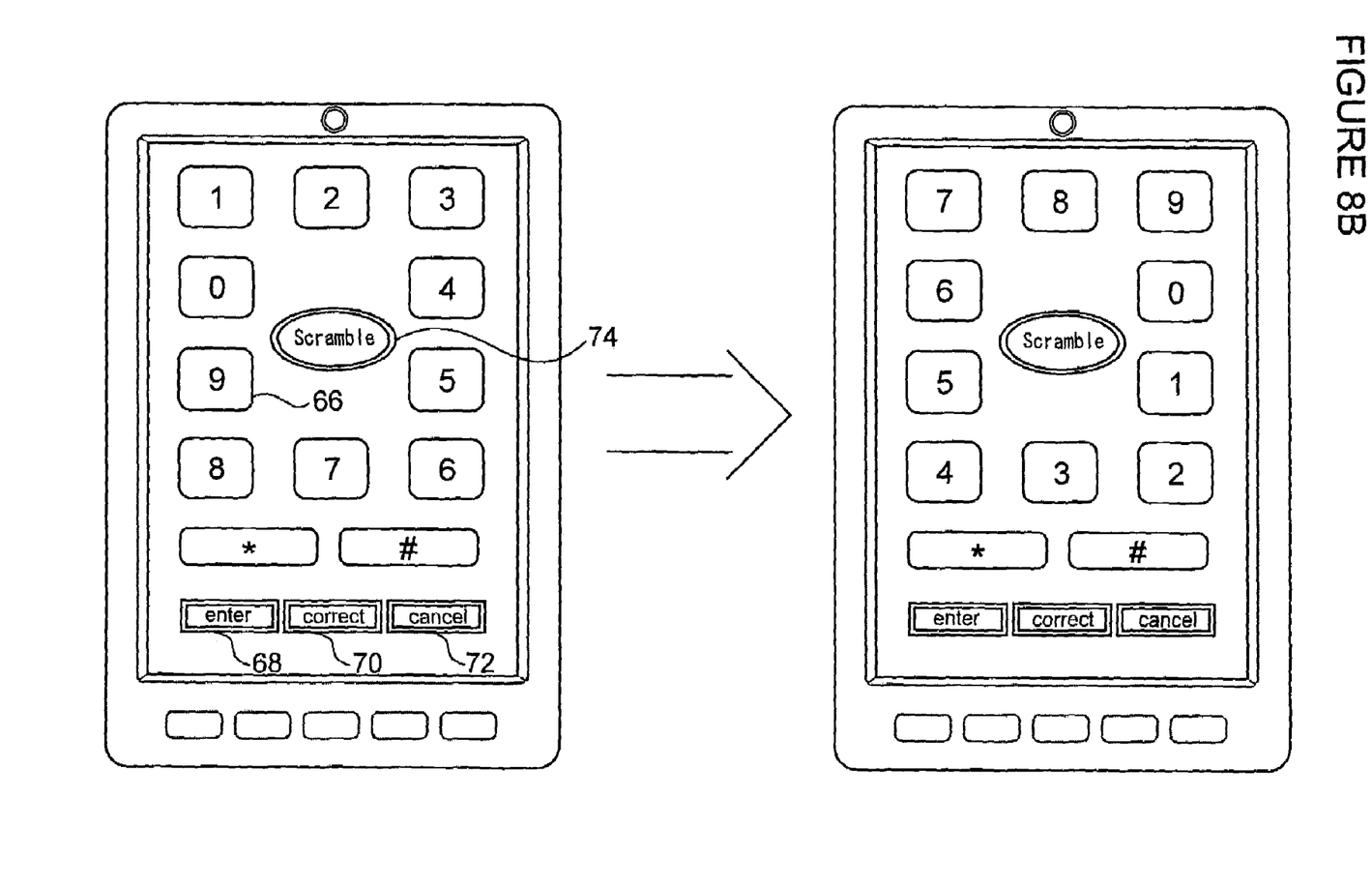
FIG. 8B: The PIN entry screen of an PDA using the information entry system according to the main embodiment.

FIG. 8B shows a rectangular version of the PIN entry screen of a PDA for which the information entry system of the present invention is adapted. The CPU 62 controls the touch screen monitor, which displays entry keys 66, an "Enter" button 68, a "Correct" button 70, a "Cancel" button 72, and a "Scramble" button 74 (Information Entry Screen Generator). The ten keys 66 have respective information of 0-9. These keys are circularly arranged in order. When the user touches the "Scramble" button 74 (Random Number Generator), these entry keys 66 rotate in order and stop at some point (Key Moving Unit). After the rotation of the keys, the CPU 62 obtains the rotation information by storing the number of key units shifted by the rotation (PIN Information Output Unit).

In order to provide additional security, a privacy filter, such as the one similar to 3M™ Privacy Computer Filter may be mounted on an ATM, POS, or PDA screen. With such a filter, only the person standing directly in front of the screen can see the screen, thus preventing persons peeking into from side from identifying the keys displayed. The use of such a filter alone won't prevent PIN number theft, since it is possible to guess key entries from finger movements if the location of keys is fixed. However, with the combination of the random shifting of key location and the use of a privacy filter make a PIN number theft by guessing or glancing key entries from finger movements virtually impossible.

Figure 9:
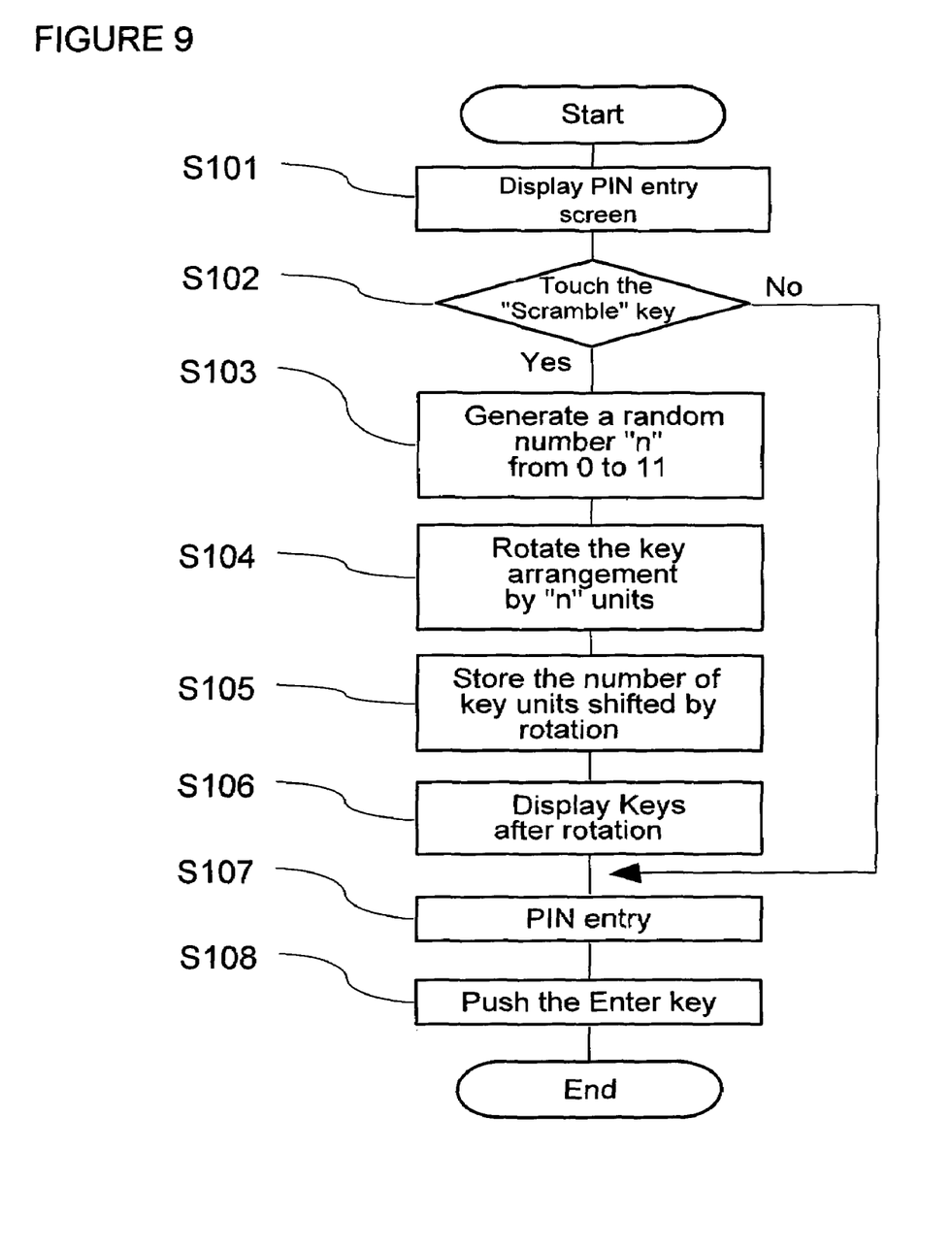
FIG. 9: The flowchart showing how the information entry system works.

How this information entry system works in the main embodiment is explained as follows with reference to the flowchart shown in FIG. 9. First a user inserts his card into the ATM to display the PIN entry screen (S101). Then the screen monitor displays the entry keys 66 circularly in order. When the user touches the "Scramble" button 74 on the screen monitor (S102), the CPU 62 generates a random number (S103) and makes the keys on the screen rotate by this random number of key units (S104). And the CPU stores the number of key units shifted by the rotation (S105), and displays the entry keys again (S106). In case the user does not touch the "Scramble" button, the user directly goes to the PIN entry step (S107). The user enters his PIN by touching the entry keys 66 displayed on the touch screen monitor 60. Then the CPU 62 recognizes which keys were selected by matching the locations the user touched and the displayed information of the keys (S107). When the user pushes the "Enter" button 68 after completing the PIN entry (S108), the CPU 62 finishes the PIN entry processing.

The user has an option of entering his PIN without pushing the "Scramble" button 74. (from S102 to S108). Alternatively, the user may push the "Scramble" button 74 after entering his PIN.

As mentioned above, the user can rotate the entry keys before or after entering his PIN. By changing the location of the keys by the rotation, it is possible to protect the PIN from theft by observation of the finger movement. Since the keys are still circularly arranged in order, not random, it is easy for users including visually handicapped people to touch the keys even after rotating this device. Accordingly, this invention provides a user with an information entry device that prevents the PIN theft and key-mistouching.

The mechanical embodiment of this invention can be used for ATM, POS, or PDA terminals. The main embodiment of this invention can be used for a PIN pad of multimedia terminals for various services, which require a PIN or password entry. It is to be understood that the above-described embodiments are illustrative of only a few of the many possible specific embodiments that can represent applications of the principles of the invention. Numerous and varied other arrangements can be readily devised by those skilled in the art without departing from the spirit and scope of the invention.

What is claimed is:

1. An information entry system having a display unit, a memory, and a controller, said controller comprising:

Information entry screen generator for generating an entry screen on said display, the entry screen including a plurality of entry keys and a scramble key;

Random number generator for generating a random number when a user touches the scramble key on said display unit, and for storing the random number in said memory;

Key moving unit for moving each of the plurality of entry keys on the display unit based on the random number stored in the memory; and Information output unit for receiving the user's entry key information created as the user selectably touches at least one of said scrambled entry keys on the display unit, and outputting said information.

* * * * *